W. A. MORSE.
Calipers.

No. 41,387.

Patented Jan. 26, 1864.

Witnesses
R. H. Morse
C. W. Huntington

Inventor
William A. Morse

UNITED STATES PATENT OFFICE.

WILLIAM A. MORSE, OF BOSTON, MASSACHUSETTS.

IMPROVEMENT IN CALIPERS.

Specification forming part of Letters Patent No. 41,387, dated January 25, 1864.

*To all whom it may concern:*

Be it known that I, WILLIAM A. MORSE, of the city of Boston, in the county of Suffolk and State of Massachusetts, have invented a new and useful Improvement in Self-Regulating Calipers; and I do hereby declare that the following is a full and exact description of the construction and operation of the same, reference being had to the annexed drawings, making a part of this specification, in which—

Figure 1:
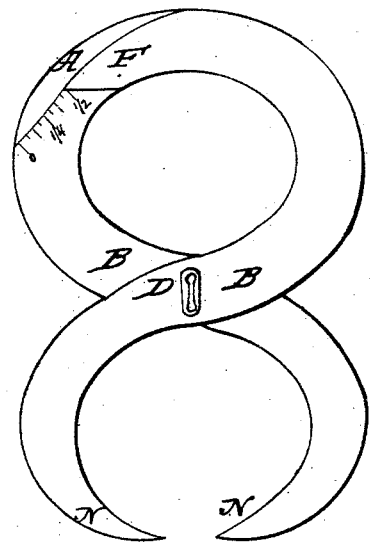
Figure 2:
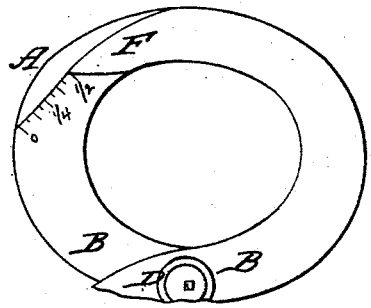

Figure 1 is a perspective view, and Fig. 2 a sectional view.

I make my self-regulating calipers of two pieces, B B, each in form of the letter S, and connected in the center by a thumb-screw, D. The points or arms F F' shut by each other, and upon one side of each is a scale, A, of inches and parts of an inch, which registers the opening distance between the points or legs N N, and may be read instantly from either side without having recourse to a rule.

What I claim as my invention, and desire to secure by Letters Patent, is—

The projecting ends or arms F F', passing each other as specified, in combination with the double scale A A', for the purpose herein shown and described.

WILLIAM A. MORSE.

In presence of—
C. W. HUNTINGTON,
R. M. MORSE, Jr.